UNITED STATES PATENT OFFICE.

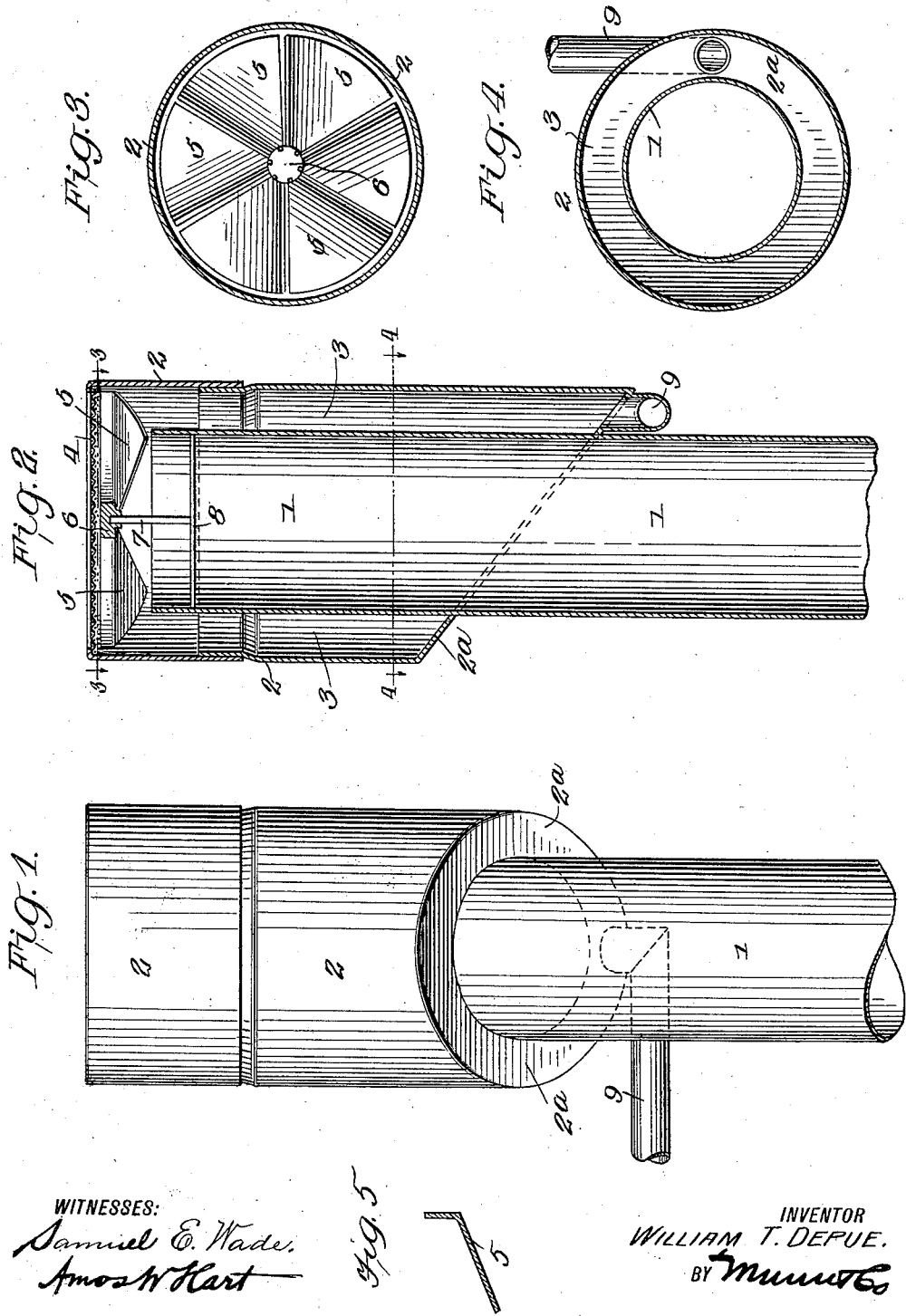

WILLIAM T. DEPUE, OF ST. LOUIS, MICHIGAN.

SPARK-ARRESTER.

997,761.     Specification of Letters Patent.     Patented July 11, 1911.

Application filed January 5, 1911. Serial No. 600,981.

*To all whom it may concern:*

Be it known that I, WILLIAM T. DEPUE, a citizen of the United States, and a resident of St. Louis, in the county of Gratiot and State of Michigan, have invented certain Improvements in Spark-Arresters, of which the following is a specification.

My invention is an improved attachment for locomotive smoke-stacks and the chimneys of stationary furnaces for the purpose of arresting sparks and cinders and reconveying them to the fire-box.

The details of construction, arrangement, and operation of parts are as hereinafter described, and illustrated in the accompanying drawing, in which—

Figure 1 is a side elevation of my attachment applied to a locomotive smoke-stack. Fig. 2 is a vertical longitudinal section of the same. Fig. 3 is a horizontal section on the line 3—3 of Fig. 2. Fig. 4 is a similar section on the line 4—4 of Fig. 2. Fig. 5 is a cross section of one of the blades of the baffle and screen scraper.

The numeral 1 indicates a cylindrical locomotive smoke-stack, and 2 a cylindrical casing attached to the top of the same and surrounding it and spaced equidistantly therefrom, thus providing an annular chamber 3 whose top is formed by a wire screen 4 and whose bottom $2^a$ is inclined at an angle of about 45°. The screen 4 may be attached to a detachable top portion or cap which will, in practice, be secured detachably to the main portion or body of the casing. Directly beneath the screen 4 there is arranged a rotatable baffle and screen scraper 5, the same being formed of a series of segmental blades which radiate from a central hub 6 and are inclined transversely at an angle of about 45°, the upper edge being also upturned vertically, as indicated in Fig. 5. The blades 5 are so constructed as regards size that a narrow space is left between them and also between their outer ends and the casing 2 which allows upward passage of the gases and the finer products of combustion. The baffle 5 is journaled centrally upon a vertical shaft 7 whose lower end is supported upon a cross bar 8 arranged diametrically in the smoke-stack 1.

Owing to the inclination of the blades 5, the baffle is rotated by the ascending current of steam or heated air and the products of combustion, and, therefore, the same effectually arrests the coarser solid products of combustion, while the gases and finer products find their way through the screen. Such products or cinders as are arrested by the baffle are also deflected by it and mainly into the receptacle formed by the annular chamber 3 having the inclined bottom $2^a$ as before stated. The products falling upon such inclined bottom are conveyed to the lowest side of the casing and discharge there through a pipe 9 which, in practice, leads back to the fire-box (not shown).

In the course of time the screen becomes clogged more or less with solid products of combustion carried upward into contact therewith, but the upwardly projecting edges of the baffle blades 5, serve to scrape and clean the screen, so that its interstices are kept mainly free and open.

While I have illustrated a locomotive smoke-stack, it is to be understood that my invention is applicable to stationary smoke-stacks or chimneys of any description, it being necessary only to modify the apparatus in respect to size and in some cases slightly in respect to form to adapt it for such uses.

What I claim is:—

In a spark-arrester of the type indicated, the combination with a smoke-stack and a casing surrounding the same and spaced therefrom and having a fixed wire screen at the top, of a rotatable baffle arranged directly beneath the screen in horizontal position and comprising a series of sector-shaped blades separated radially by narrow spaces and having their upper edges upturned for scraping the screen, as shown and described.

WILLIAM T. DEPUE.

Witnesses:
JAMES K. WRIGHT,
EMRI J. WELLS.

---

Copies of this patent may be obtained for five cents each, by addressing the "Commissioner of Patents, Washington, D. C."